(12) United States Patent
Li et al.

(10) Patent No.: US 11,354,029 B2
(45) Date of Patent: Jun. 7, 2022

(54) CONTENT COLLECTION METHOD, APPARATUS AND STORAGE MEDIUM

(71) Applicant: BEIJING XIAOMI MOBILE SOFTWARE CO., LTD., Beijing (CN)

(72) Inventors: Jiayi Li, Beijing (CN); Zhaoqin Lin, Beijing (CN); Ming Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/558,148

(22) Filed: Sep. 1, 2019

(65) Prior Publication Data

US 2020/0192540 A1 Jun. 18, 2020

(30) Foreign Application Priority Data

Dec. 17, 2018 (CN) .......................... 201811544050.0

(51) Int. Cl.
*G06F 3/0484* (2022.01)
*G06F 3/0486* (2013.01)
*G06F 3/0488* (2022.01)
*G06F 1/16* (2006.01)
*G06F 3/14* (2006.01)
*G06F 3/0482* (2013.01)

(52) U.S. Cl.
CPC .......... *G06F 3/0486* (2013.01); *G06F 1/1618* (2013.01); *G06F 1/1649* (2013.01); *G06F 3/0482* (2013.01); *G06F 3/1423* (2013.01)

(58) Field of Classification Search
CPC .... G06F 3/0486; G06F 3/0482; G06F 3/1423; G06F 1/1618; G06F 1/1649
See application file for complete search history.

(56) References Cited

U.S. PATENT DOCUMENTS

| 5,598,524 | A | * | 1/1997 | Johnston, Jr. | G06F 3/0486 715/769 |
| 2012/0110486 | A1 | * | 5/2012 | Sirpal | G06F 1/1641 715/770 |
| 2012/0144286 | A1 | * | 6/2012 | Bank | G06F 3/0308 715/230 |
| 2014/0101575 | A1 | * | 4/2014 | Kwak | G06F 3/0486 715/761 |
| 2015/0121240 | A1 | * | 4/2015 | Boonstoppel | G06F 9/543 715/739 |

(Continued)

FOREIGN PATENT DOCUMENTS

| CN | 102722322 A | 10/2012 |
| CN | 103197879 A | 7/2013 |

(Continued)

OTHER PUBLICATIONS

Search Report for EP application 19200415.8 dated Apr. 2, 2020.

(Continued)

*Primary Examiner* — Nhat Huy T Nguyen
(74) *Attorney, Agent, or Firm* — Syncoda LLC; Feng Ma

(57) ABSTRACT

A content collection method involving a user terminal or smart device includes: displaying a target interface on a home screen; displaying a collection panel in a secondary screen when the secondary screen is in an expanded state; acquiring a collection instruction corresponding to target content in the target interface; adding the target content to the collection panel according to the collection instruction.

20 Claims, 14 Drawing Sheets

(56) References Cited

U.S. PATENT DOCUMENTS

| | | |
|---|---|---|
| 2015/0309691 A1 | 10/2015 | Seo et al. |
| 2017/0154015 A1 | 6/2017 | O'Keeffe et al. |
| 2018/0248997 A1 | 8/2018 | Velusamy et al. |

FOREIGN PATENT DOCUMENTS

| | | |
|---|---|---|
| CN | 103369048 A | 10/2013 |
| CN | 103389984 A | 11/2013 |
| CN | 103477304 A | 12/2013 |
| CN | 103559288 A | 2/2014 |
| CN | 103729157 A | 4/2014 |
| CN | 105335455 A | 2/2016 |
| CN | 105867531 A | 8/2016 |
| CN | 106293580 A | 1/2017 |
| CN | 106603823 A | 4/2017 |
| CN | 106649448 A | 5/2017 |
| CN | 108196760 A | 6/2018 |

OTHER PUBLICATIONS

1st Office Action in CN 201811544050.0 dated May 28, 2020.
CN Second Office Action in Application No. 201811544050.0, dated Nov. 27, 2020.
Notice of Allowance in CN 201811544050.0 dated Jun. 22, 2021.
Jiao Yin Yan Lei, "How to set the automatic collection of Mi phones", Aug. 6, 2018; https://jingyan.baidu.com/article/6181c3e0cf0da2152ef153f3.html.

\* cited by examiner

CONTENT COLLECTION METHOD, APPARATUS AND STORAGE MEDIUM

CROSS-REFERENCE TO RELATED APPLICATION

This application claims priority to Chinese Patent Application No. 201811544050.0, filed on Dec. 17, 2018, the entire contents thereof are incorporated herein by reference.

BACKGROUND

When a user is reading a useful content by using a user terminal, i.e. a display on a smart device, the content can be stored for reference on subsequent use.

In the related art, the user terminal or smart device is often provided with a collection panel which is a display panel for the user to add and view their previously collected content. When the user is browsing information by using an application program, if the user needs to open the collection panel, the user terminal or smart device first needs to exit the application program and then switch to a desktop mode for displaying. Then an operation entry for triggering the display of the collection panel is funded on a desktop, and then the collection panel is opened.

SUMMARY

The present disclosure relates to the field of user terminals or smart device and display technologies, and in particular, to a content collection method, and an apparatus and a storage medium for implementing it.

A content collection method, an apparatus and a storage medium are provided by embodiments of the present disclosure.

According to a first aspect of the embodiments of the present disclosure, a content collection method is provided, the method is applied to a terminal or smart device having a folding display screen including a home screen and secondary screens of which a number is n, and the home screen and the secondary screens are foldable with each other, and the n is a positive integer;

the method including:
displaying a target interface on the home screen;
displaying a collection panel in a secondary screen when the secondary screen is in an expanded state;
acquiring a collection instruction corresponding to target content in the target interface;
adding the target content to the collection panel according to the collection instruction.

In some embodiments, the acquiring a collection instruction corresponding to target content in the target interface includes:
receiving a first drag operation signal of which a start position is located at the target content in the target interface and an end position is located at the collection panel;
generating a collection instruction corresponding to the target content according to the first drag operation signal.

In some embodiments, the collection panel includes a collection operation control; the method further includes:
acquiring a first trigger signal corresponding to the collection operation control;
adding an interface address corresponding to the target interface to the collection panel according to the first trigger signal.

In some embodiments, the collection panel includes a screen capture operation control; the method further includes:
acquiring a second trigger signal corresponding to the screen capture operation control;
performing a screen capture operation on display content in the home screen to obtain a screen capture image
adding the screen capture image to the collection panel.

In some embodiments, the collection panel includes a screen recording operation control; the method further includes:
acquiring a third trigger signal corresponding to the screen recording operation control;
performing a screen recording operation on the display content in the home screen to obtain a screen recording video according to the third trigger signal;
adding the screen recording video to the collection panel.

In some embodiments, the method further including:
displaying a user interface of a target application program in the home screen or another secondary screen;
receiving a second drag operation signal of which the start position is located at the target content in the collection panel and the end position is located at the user interface of the target application program;
sharing the target content to the target application program according to the second drag operation signal.

In some embodiments, the method further including:
identifying specified information comprised in the target interface, and the specified information comprises at least one of the following: a communication number, an address and a mailbox;
adding the specified information to the collection panel.

According to a second aspect of the embodiments of the present disclosure, a content collection apparatus is provided, the apparatus is applied to a terminal or smart device having a folding display screen including a home screen and secondary screens of which a number is n, and the home screen and the secondary screens are foldable with each other, and the n is a positive integer;

the apparatus including:
a target interface display module configured to display a target interface in the home screen;
a collection panel display module configured to display a collection panel in a secondary screen when the secondary screen is in an expanded state;
a collection instruction acquisition module configured to acquire a collection instruction corresponding to target content in the target interface;
a content collection module configured to add the target content to the collection panel according to the collection instruction.

In some embodiments, the collection instruction acquisition module is configured to:
receive a first drag operation signal of which a start position is located at the target content in the target interface and an end position is located at the collection panel;
generate a collection instruction corresponding to the target content according to a first drag operation signal.

In some embodiments, the collection panel includes a collection operation control, the apparatus further includes:
a collection signal acquisition module configured to acquire a first trigger signal corresponding to the collection operation control;
the content collection module further configured to add an interface address corresponding to the target interface to the collection panel according to the first trigger signal.

In some embodiments, the collection panel includes a screen capture operation control; the apparatus further includes:

a screen capture signal acquisition module configured to acquire a second trigger signal corresponding to the screen capture operation control;

a content screen capture operation module configured to perform a screen capture operation on the display content in the home screen to obtain a screen capture image;

the content collection module further configured to add the screen capture image to the collection panel.

In some embodiments, the collection panel includes a screen recording operation control; the apparatus further includes:

a screen recording signal acquisition module, configured to acquire a third trigger signal corresponding to the screen recording operation control;

a content screen recording operation module, configured to perform a screen recording operation on the display content in the home screen to obtain a screen recording video according to the third trigger signal;

the content collection module further configured to add the screen recording video to the collection panel.

In some embodiments, the apparatus further including:

a user interface display module configured to display a user interface of a target application program in the home screen or another secondary screen;

a drag signal receiving module configured to receive a second drag operation signal of which a start position is located at the target content in the collection panel and the end position is located at the user interface of the target application program;

a target content sharing module configured to share the target content to the target application program according to the second drag operation signal.

In some embodiments, the apparatus further including:

a specified information identification module configured to identify a specified information included in the target interface, and the specified information includes at least one of the following: a communication number, an address and a mailbox;

the content collection module further configured to add the specified information to the collection panel.

According to a third aspect of the embodiments of the present disclosure, a content collection apparatus is provided, the apparatus is applied to a terminal or smart device having a folding display screen including a home screen and secondary screens of which a number is n, and the home screen and the secondary screens are foldable with each other, and the n is a positive integer;

the apparatus including:

a processor;

a memory for storing executable instructions of the processor;

wherein the processor is configured to:

display a target interface in the home screen;

display a collection panel in a secondary screen when a secondary screen is in an expanded state;

acquire a collection instruction corresponding to target content in the target interface;

add the target content to the collection panel according to the collection instruction.

According to a fourth aspect of the embodiments of the present disclosure, there is provided a non-transitory computer-readable storage medium, on which a computer program is stored. When the computer program is executed by a processor, any one of the steps of the method according to the first aspect can be implemented.

It should be understood that, the above general description and the following detailed description are merely exemplary and explanatory and are not limiting of the disclosure.

BRIEF DESCRIPTION OF THE DRAWINGS

The accompanying drawings, which are incorporated in the specification and constitute a part of this specification, illustrate embodiments consistent with the present disclosure and explain the principles of the present disclosure in conjunction with the specification.

DETAILED DESCRIPTION

Figure 1:
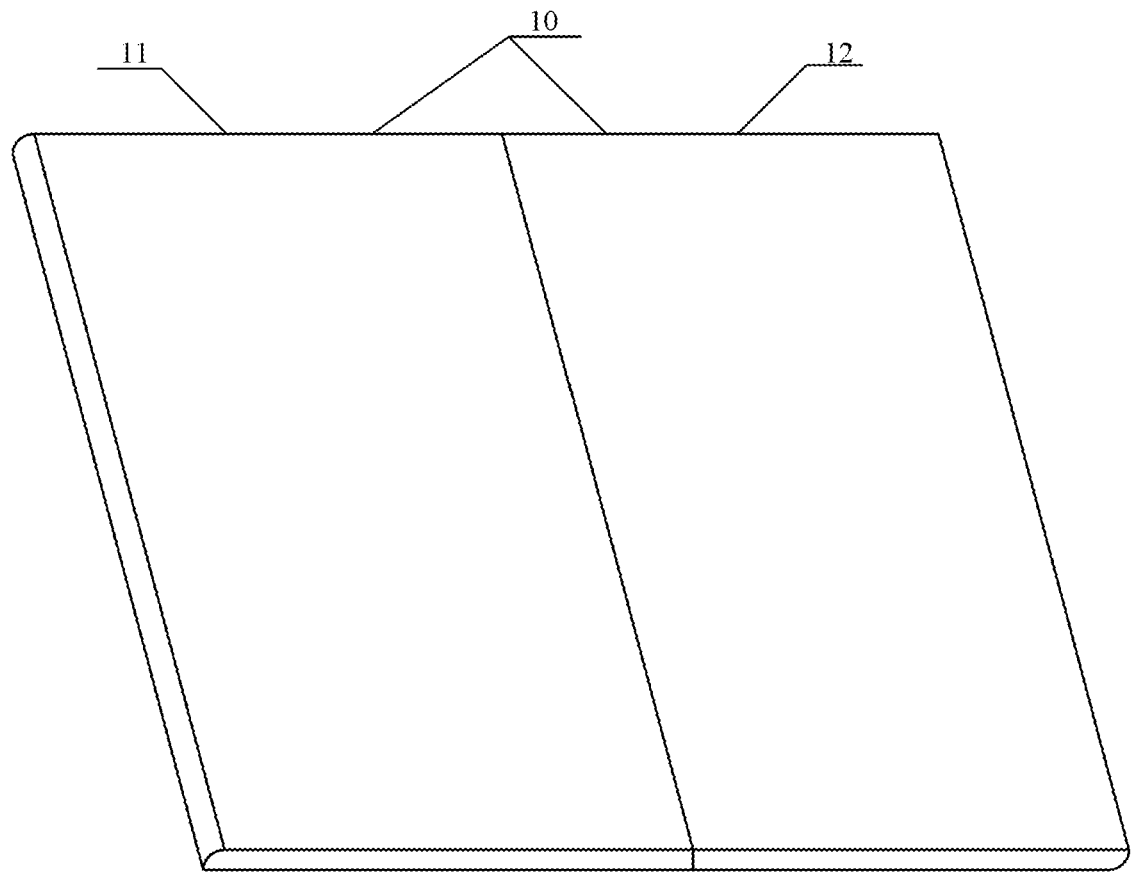
FIG. 1 illustrates a top perspective view of an exemplary schematic diagram of a smart device having an exemplary folding display screen in an open configuration in accordance with various aspects of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element is referred to as being "connected" or extending "to" another element, it can be directly over or extend directly over the other element or intervening elements can also be present. In contrast, when an element is referred to as being "directly connected" or extending "directly to" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "up" or "down" or "left" or "right" or "below" or "above" or "upper" or "lower" or "horizontal" or "vertical" can be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The execution body of each step of the method provided by the embodiment of the present disclosure can be implemented by a user terminal such as a smart device, but may also be implemented by other electronics having a screen, local non-transitory computer-readable media, and processing capabilities. The above user terminal can be an electronic device such as a mobile phone, a tablet computer, an e-book reader, a multimedia playback device, a wearable device, a laptop portable computer, or the like.

The inventors of the present disclosure have recognized that, a collection panel of a conventional user terminal can affect a normal display of the application program that the user is using, which is inconvenient for user operations.

The user terminal as contemplated herein can be provided with a folding display screen. The folding display screen is a display screen which can be folded from an extended state into a more compact or folded state. The folding display screen as contemplated herein can provide various display functions of traditional display screen, but can further include foldable features wherein various portions of the folding display can have varying properties between portions thereof. The folding display screen can be provided with two screen states including a folded state and an expanded state. When the folding display screen is in the folded state, space occupied by the user terminal or smart device can be reduced, and when the folding display screen is in the expanded state, a larger display screen area of use can thus be provided for users.

The folding display screen contemplated herein can include a home screen and at least one secondary screen, wherein the home screen and the secondary screen can be foldable with respect to one another. The folding display screen can be provided as a left and right folding display screen or a top and bottom folding display screen, and can further be provided as an outward folding display screen or an inward folding display screen, or can be provided as a combination of the outward folding display screen and the inward folding display screen. The exemplary embodiments of the present disclosure are not intended to be limiting, and as such the various display screens can be provided in any conceivable orientation.

In one aspect of the present disclosure, the folding display screen can include a home screen and a secondary screen being configured as respective left and right folding display screen so as to provide a contextual example of structural forms of the folding display screen in the following disclosure.

In a first exemplary embodiment, and as shown in FIG. 1, the folding display screen 10 can include a home screen 11 and a secondary screen 12 which are connected together by a connecting mechanism. The above connecting mechanism can be provided as a hinge or a rotating shaft, or other components that can connect and thus allow for folding of the two respective screens, such as a flexible screen, and the embodiments of the present disclosure should not be read as limiting, and as such one of ordinary skill in the art will recognize various alternative methods of affixing the folding screens one to another.

Additionally, the physical properties of the two screens such as materials, sizes, shapes, and the like can be same or different, and as such the particular materials and physical properties as discussed in the various embodiments of the present disclosure s are not intended to be limiting, but are discussed only to provide context and for purposes of illustration. For example, the two screens can both be provided as rigid screens, or the two screens can both be provided as flexible screens, or one of the two screens can be provided as a rigid screen and another is provided as a flexible screen. Additionally, one of the two screens can be provided being larger in size, which can be used as the home screen, and another screen can thus be smaller, which can be used as the secondary screen. In yet another example, one of the two screens can be thicker, wherein the secondary screen can be thinner.

Figure 2:
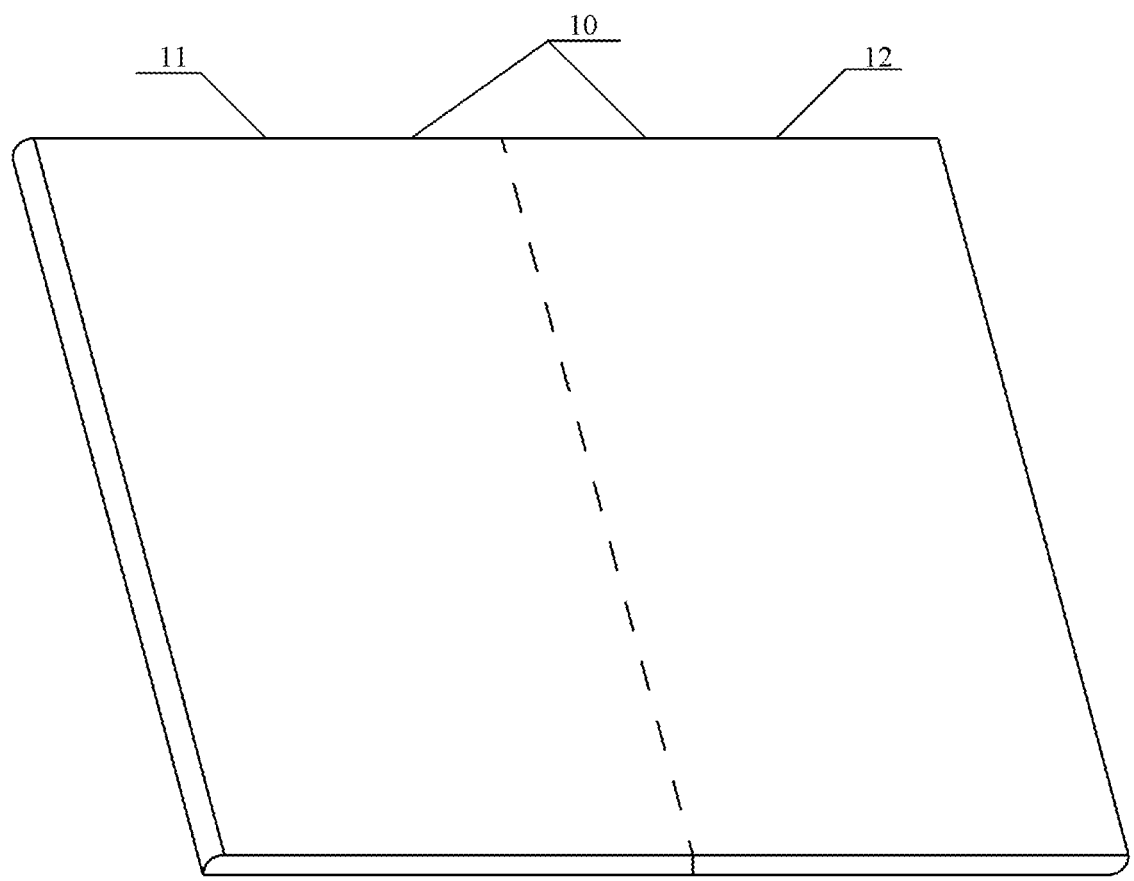
FIG. 2 illustrates a bottom a perspective view of an exemplary schematic diagram of the terminal or the smart device of FIG. 1 having an exemplary folding display screen in an open configuration in accordance with various aspects of the present disclosure.

In a second embodiment: the folding display screen 10 can include a unitary portion of the screen, and wherein the unitary portion of the screen can be provided as a unitary portion of flexible screen, or can be provided as a piece of screen formed by a seamless combination of the flexible screen and the rigid screen by a related production process. As shown in FIG. 2, when the folding display screen 10 is provided as the unitary portion of flexible screen, the folding display screen 10 can be divided into the home screen 11 and one secondary screen 12. In the embodiment, the sizes of the home screen 11 and the secondary screen 12 can be the same or different.

A screen state of the folding display screen as discussed herein can refer to a folding situation of the folding display screen. When the folding display screen includes two portions of screens, in other words, the home screen and one secondary screen, wherein the screen state of the folding display screen can include a folded state, as shown in FIG. 3 and an expanded state, as shown in FIG. 1 and FIG. 2.

Figure 3:
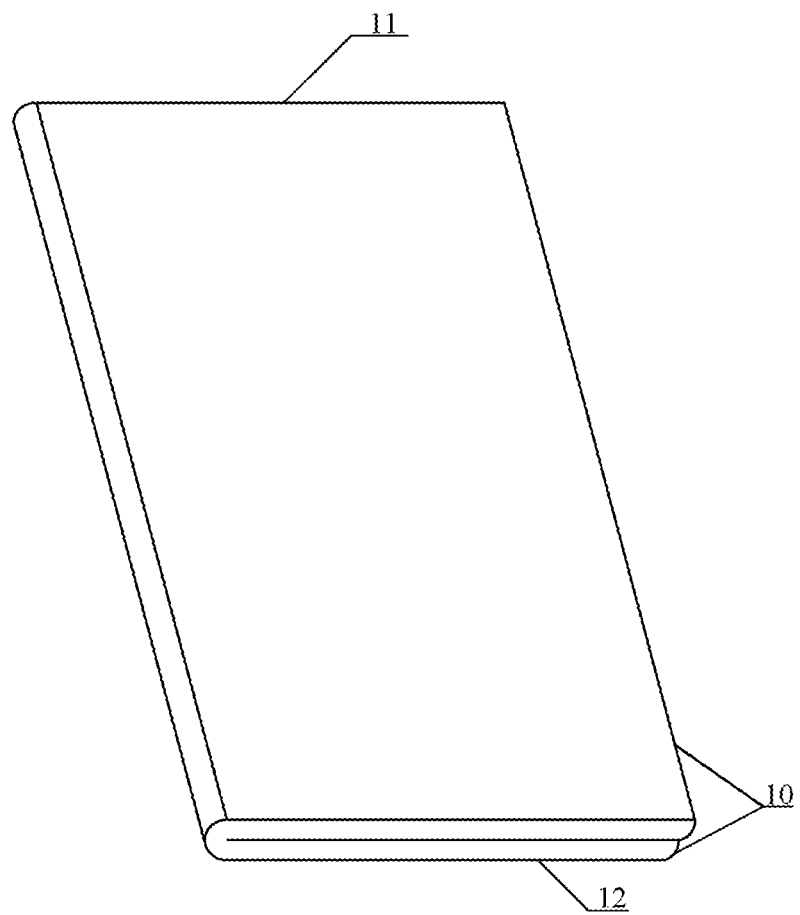
FIG. 3 illustrates a top a perspective view of an exemplary schematic diagram of the terminal or the smart device of FIG. 1 having an exemplary folding display screen in a folded configuration in accordance with various aspects of the present disclosure.

Illustratively, as shown in FIG. 3, the folded state refers to a state in which the home screen 11 and the secondary screen 12 of the folding display screen 10 are parallel and front surfaces of the two screens are facing in opposing directions, or toward one another, or away from one another. A front surface of the screen refers to a surface configured to display a user interface. Illustratively, as shown in FIG. 1, the expanded state refers to the state in which the home screen 11 and the secondary screen 12 of the folding display screen are expanded into a common plane and the front surfaces of the two screens are facing in a common direction.

In the following, the folding display screen can include the home screen and two secondary screens. In other words, the folding display screen can include three screens. The folding display screen being provided as the left and right folding display screen are taken as an example to introduce the two kinds of structural forms of the folding display screen as follows.

Figure 4:
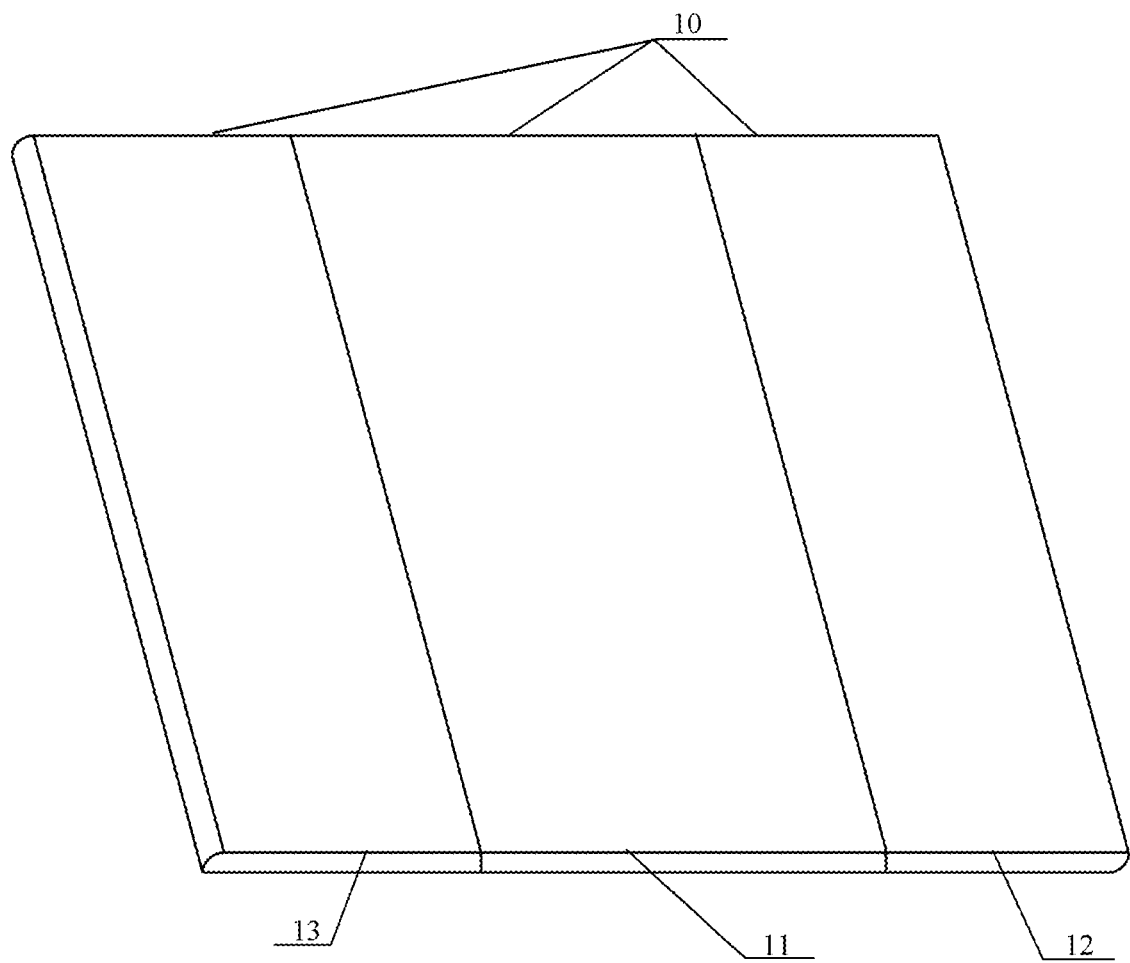
FIG. 4 illustrates a top perspective view of an exemplary schematic diagram of an alternative smart device having an alternative exemplary folding display screen in an open configuration in accordance with various aspects of the present disclosure.

The first such embodiment: as shown in FIG. 4, illustrates a user terminal in which the two opposing secondary screens of the folding display can be provided. In such an embodiment, the folding display screen 10 can thus include a home screen 11, a first secondary screen 12 and a second secondary screen 13, and the home screen 11 is connected with the first secondary screen 12 and the second secondary screen 13, each affixed to one another by an associated connecting mechanism, respectively. In the present embodiment of the present disclosure, the first secondary screen 12 and the second secondary screen 13 can be provided being symmetrical with each other. In other embodiments, the first secondary screen 12 and the second secondary screen 13 can further be provided being non-symmetrical with each other, which symmetry or non-symmetry is not intended to be limiting.

Figure 5:
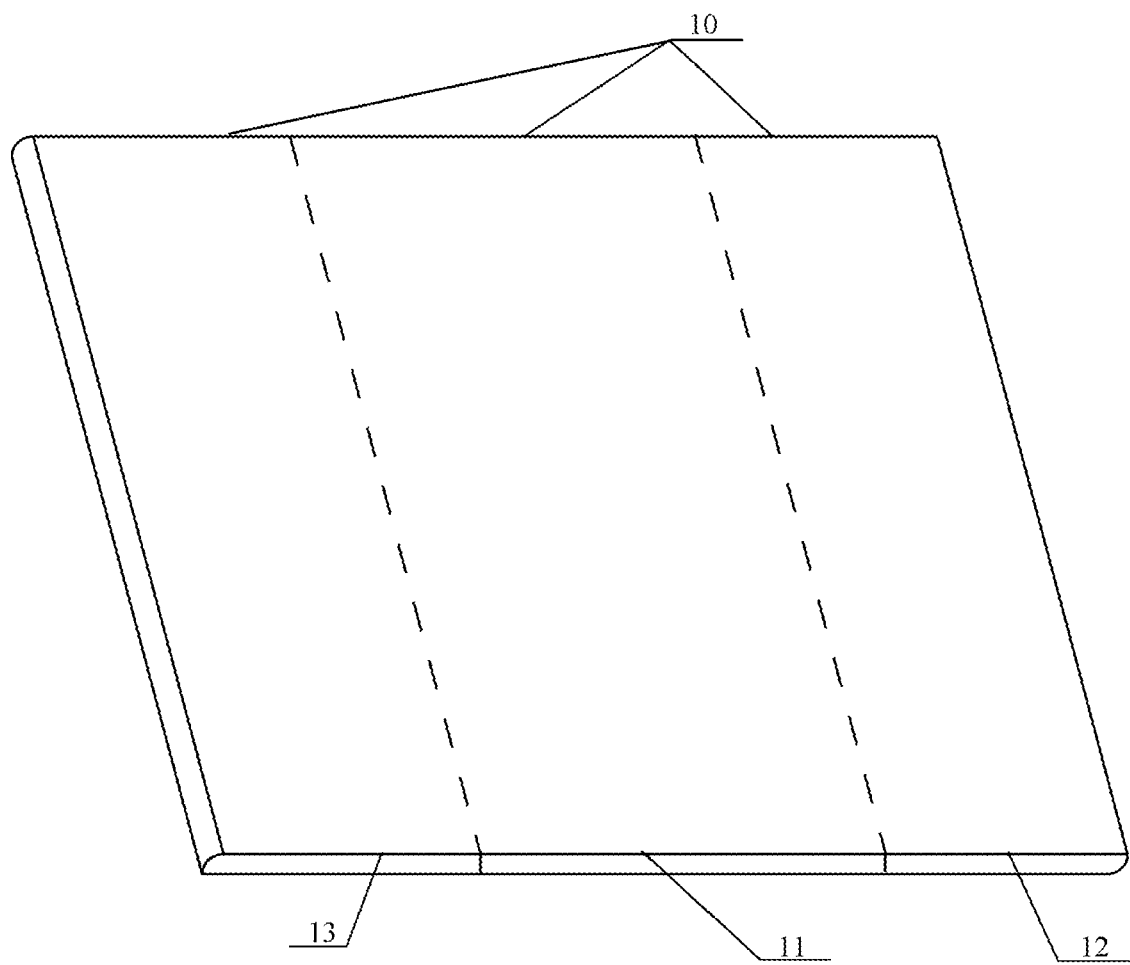
FIG. 5 illustrates a bottom a perspective view of an exemplary schematic diagram of the smart device of FIG. 4 having an exemplary folding display screen in an open configuration in accordance with various aspects of the present disclosure.

The second such embodiment: as shown in FIG. 5, can include a user terminal having a folding display screen 10 which is provided as an entire portion of screen, wherein the entire portion of the screen can be provided as a flexible screen. In this embodiment, the folding display screen 10 can be divided into three distinct portions. In other words, the home screen 11, the first secondary 12 and the second secondary screen 13 can be provided as distinct portions of a single foldable screen. In other embodiments, the folding display screen 10 can further be divided into any number of additional screens.

In some additional embodiments, the folding display screen 10 can be formed by a seamless combination of a flexible screen and a rigid screen. For example, the home screen 11 can be provided as a flexible screen, and at least one of the first secondary 12 and the second secondary screen 13 can then be provided as a rigid screen. For another example, the home screen 11 can be provided as a rigid screen, and the first secondary screen 12 and the second secondary screen 13 can then be provided as flexible screens.

Figure 6:
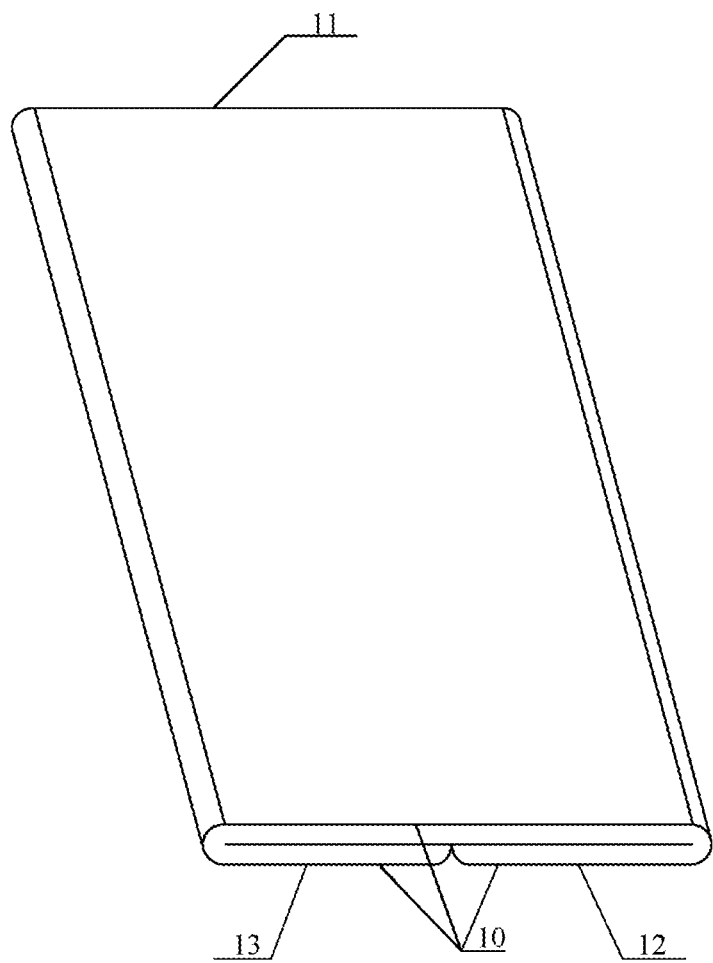
FIG. 6 illustrates a top a perspective view of an exemplary schematic diagram of the smart device of FIG. 4 having an exemplary folding display screen in a folded configuration in accordance with various aspects of the present disclosure.

When the folding display screen includes three screens, that is, the home screen, the first secondary screen, and the second secondary screen, the screen state of the folding display screen can then include a folded state, an expanded state, and a semi-expanded state. The screen state of the folding display screen can be any one of the folded state, the expanded state, and the semi-expanded state. Illustratively, as shown in FIG. 6, the folded state can refer to a state in which the home screen 11, the first secondary screen 12 and the second secondary screen 13 are all parallel, and the front surfaces of the first secondary screen 12 and the second secondary screen 13 and the front surface of the home screen 11 are facing in opposing directions.

Illustratively, as shown in FIG. 4, the expanded state can refer to a state in which the home screen 11, the first secondary screen 12 and the second secondary screen 13 of the folding display screen are expanded into a common plane, wherein the front surfaces of the first secondary screen 12 and the second secondary screen 13 and the front surface of the home screen 11 are facing in the same direction.

Figure 7:
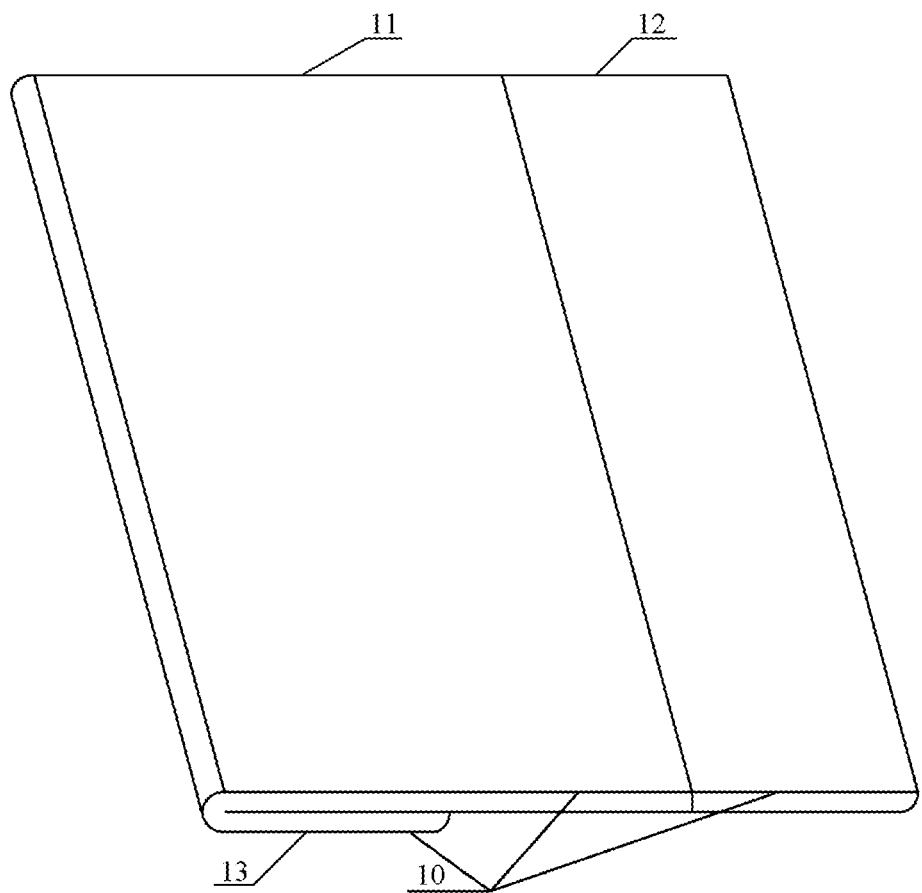
FIG. 7 illustrates a top a perspective view of an exemplary schematic diagram of the smart device of FIG. 4 having an exemplary folding display screen in a partially folded configuration in accordance with various aspects of the present disclosure.

Illustratively, as shown in FIG. 7, the semi-expanded state can refer to a state between the folded state and the expanded state. In other words, in the semi-expanded state can be a situation in which one of the two secondary screens is in the expanded state and another secondary screen is in the folded state. At this time, the home screen 11 of the folding display screen 10 is in a common plane with one of the secondary screens (such as the first secondary screen 12 or the second secondary screen 13) and the front surface of the home screen 11 and the front surface of the secondary screen are facing in the same direction. In contrast, simultaneously, the front surface of the home screen 11 and the front surface of another secondary screen are facing in the opposite direction, as shown.

Figure 8:
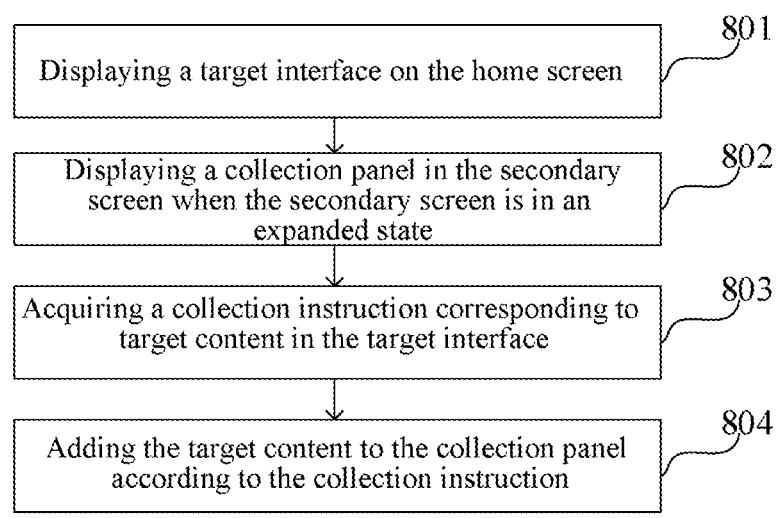
FIG. 8 illustrates a flowchart of a content collection method according to an exemplary embodiment.

FIG. 8 illustrates a flowchart showing a content collection method according to an exemplary embodiment. In the present embodiment, the method being applied to the user terminal or smart device having the folding display screen are taken as an example for purposes of illustration. The folding display screen can include the home screen and the secondary screens of which the number is n, and the home screen and the secondary screens are foldable with each other, wherein n is a positive integer. The method can include the following steps (801~804).

In step 801: a target interface on the home screen is displayed.

The target interface can be any one of a plurality of known interfaces. For example, the target interface can be provided as a web page or a user interface displayed separate from of an additional application program, and the embodiments of the present disclosure do not limit the type of the target interface. The target interface can include content for the user to check, and can further include an operation control for the user to perform human-computer interaction.

When the number n of secondary screens is equal to 1, the screen state of the folding display screen can include the folded state and the expanded state. The folded state can then refer to a state in which the home screen and the secondary screen are parallel and the front surfaces of the two screens are facing in the opposite direction. The expanded state can then refer to a state in which the home screen and the secondary screen are expanded into a common plane and the front surfaces of the two screens are facing in a common direction.

When the number n of secondary screens is larger than 1, the screen state of the folding display screen can include the folded state and the expanded state and the semi-expanded state. The folded state refers to the state in which the home screen and secondary screens of number n are all parallel, and the front surfaces of the secondary screens of number n are and the front surface of the home screen are facing in the opposite direction. The expanded state refers to the state in which the home screen and the secondary screens of number n are in a common plane, and the front surfaces of the secondary screens of number n and the home screen are facing in the same direction. The semi-expanded state refers to the state in which a part of the secondary screens of number n is in the expanded state, while another part of the secondary screens of number n is in the folded state.

In an example, the target interface can be displayed in a home screen when the folding display screen is in the folded state.

In another example, the target interface can be displayed in the home screen when the folding display screen is in the semi-expanded state. In this embodiment, and in other embodiments, the target interface can be displayed in the home screen and the secondary screen can be in the expanded state when the folding display screen is in the semi-expanded state.

In step 802, the collection panel in the secondary screen can be displayed when the secondary screen is in the expanded state.

In the embodiment, the secondary screen in the step can be any one of the secondary screens of number n.

In one example, the collection panel is triggered and displayed by taking the following method. When the terminal or smart device detects an expansion operation corresponding to the secondary screen, the collection panel can be displayed on the secondary screen. In this embodiment, the terminal or smart device can be provided with a function of detecting an expansion operation. For example, the terminal or smart device can include a Hall sensor through which the terminal or smart device can detect the expansion operation of the user expanding the secondary screen. When the terminal or smart device detects the expansion operation corresponding to any one of the secondary screens, the terminal or smart device is triggered to display the collection panel in the secondary screen, and the user can perform corresponding operations on the collection panel.

In some other embodiments, the display of collection panel can further be triggered by other methods, such as by a touch operation, a voice, a gesture, etc., which can then be utilized so as to trigger the display functions of the collection panel.

The collection panel can also be configured to store and display collected content. The collected content can be a text, a picture, an audio file, a video file, a webpage link, etc., which examples are not intended to be limiting but only illustrative of various aspects of the present disclosure. The collection panel can be displayed the collected content in chronological order, or display the collected content according to format of the collected content. For example, the collected content can be displayed in categories in accordance with pictures, files, and web page links. The collection panel can then be displayed in full screen on the secondary screen or displayed in a reduced sized window on the secondary screen.

In some additional embodiments, the collection panel can be further provided with a function of sharing the collected content to the application program. At this time, the collection panel can further be referred to as a clipboard or a cut panel. The related sharing process will be referred to in greater detail in additional embodiments provided below.

In step 803: a collection instruction corresponding to target content can be acquired in the target interface.

The target content can be in a format such as a text, a picture, a file, or a webpage link, wherein it will be appreciated that any particular format of the target content is not intended to be limiting, but only illustrative of, various embodiments of the present disclosure.

The collection instruction as contemplated herein can be provided as an operation instruction for saving the target content to the collection panel. The collection instruction can be triggered by the user through touch, for example, the user can drag the target information to the collection panel to trigger the collection instruction. Of course, in other possible embodiments, the above mentioned collection instruction can be triggered by a voice, a gesture, or the like, which examples are not intended to be limiting, but only illustrative of, various aspects of the present disclosure.

In the embodiment, the folding display screen can include a function of receiving a touch operation. For example, the folding display screen can include a touch sensing layer, wherein various touch operations such as clicking, sliding, pressing, etc., is received by the user through the touch sensing layer. It will then be appreciated that the user can perform the above mentioned touch operations by utilizing a finger or a stylus.

In some embodiments, when the target content in the target interface supports dragging, the above-mentioned collection instruction can include the following sub-steps (803a-803b).

In step 803a: a first drag operation signal of which a start position can be located at the target content in the target interface and an end position which can then be located at the collection panel is received.

The first drag operation signal ca be an operation signal for dragging the target content from the target interface to the collection panel.

In step 803b: the collection instruction corresponding to the target content can be generated according to the first drag operation signal.

When the terminal or smart device detects the first drag operation signal, the terminal or smart device can then generate the collection instruction corresponding to the target content.

In some such embodiments, the terminal or smart device can display a thumbnail corresponding to the target content during duration of the first drag operation signal. For example, the terminal or smart device can display the thumbnail corresponding to the target content at a current touch position, and the position of the thumbnail can then be moved with the movement of the current touch position. When the target content is the picture, the thumbnail can be a reduced figure of the picture. When the target content is text, the thumbnail can be the reduced figure of a pattern formed by start words and end words of text in the target interface.

In some such embodiments, the terminal or smart device can then be utilized to specify the type of content that can be dragged and the thumbnail that will be displayed when dragging.

In some additional such embodiments, the user can confirm dragged content according to the above thumbnail, that is, whether the dragged content is content that is needed to be collected. A storage path of the target content can then be set by the terminal or smart device or can alternatively be set by the user, which is not intended to be limiting, but only illustrative of, various aspects of the present disclosure.

In yet another embodiment, when the target interface includes specified information, the smart device can automatically identify the specified information included in the target interface. The specified information can include but is not limited to at least one of the following: a communication number, an address, a mailbox. Then, the terminal or smart device can add the specified information to the collection panel. For example, the target interface can include the communication number which can be a mobile phone number, a user account in an instant messaging application, or a user account in a social application, and the terminal or smart device can automatically recognize the communication number and add it to the collection panel. In such embodiments, the specified information can then be added to the collection panel in text format.

In step 804: the target content can be added to the collection panel according to the collection instruction.

In some such embodiments, after the collection instruction is received, the terminal or smart device can create a label of the target content in the collection panel. In some such embodiments the label can include information such as the thumbnail corresponding to the target content, a collection time corresponding to the target content, a source of the target content, etc.

In yet another embodiment, the collection panel can include several labels arranged in a list. Each of the labels can then be associated with the collected content. In the embodiment, the labels can be arranged in chronological order. For example, the labels can be arranged sequentially one by one in order of time received from earliest to latest, or from latest to earliest. Of course, in some other embodiments, the terminal or smart device can display the content in the collection panel in other forms, such as an array form, which is not intended to be limiting, but only illustrative of, various aspects of the present disclosure.

In addition, when the terminal or smart device receives a selection signal of the label corresponding to the target content in the collection panel, the terminal or smart device can display the details of the target content in the collection panel. For example, the user can click on the label of the target content in the collection panel, and the terminal or smart device can then display the details of the target content in the collection panel.

Figure 9:
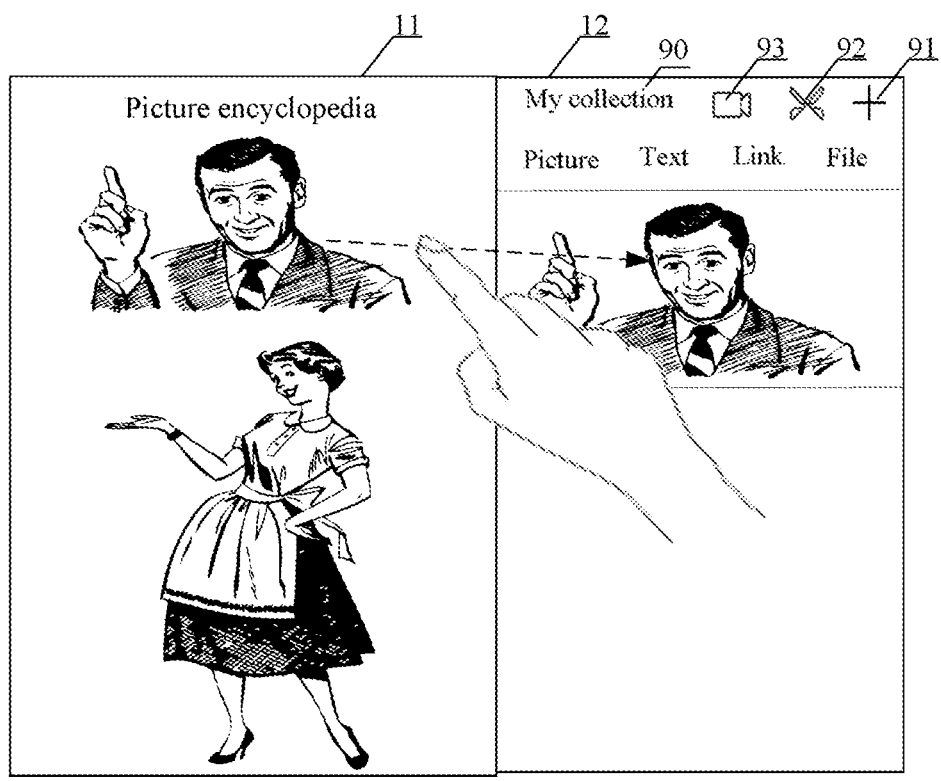
FIG. 9 illustrates a schematic diagram of an exemplary interface of a content collection process.

Referring to FIG. 9, a "picture encyclopedia" interface is displayed on the home screen 11. In this exemplary embodiment, pictures are displayed in the interface, and a collection panel 90 is displayed on the secondary screen 12. If the user wants to collect the first picture in the picture encyclopedia into the collection panel 90, the user can drag the picture from the home screen 11 into the collection panel 90, thereby realizing that the picture is added to the collection panel 90.

It should be noted that, the collection panel in the embodiment of the present disclosure is a global collection panel, and the content in any interface of any application program in the terminal or smart device can be collected.

It should also be noted that, in the embodiments of the present disclosure, when the folding display screen is in the folded state, the collection panel can be called out in the expanded secondary screen by expanding the secondary screen and such examples are only intended to be illustrative and not limiting with regard to the inventive concepts contained in this disclosure. In other embodiments, when the folding display screen is in the semi-expanded state, calling out the collection panel in the expanded secondary screen by expanding the secondary screen is further supported. The specific process is similar to the above embodiment, and details do not need to be described herein again.

In summary, in the technical solutions provided by the embodiments of the present disclosure, the display scheme of the collection panel can be provided for the terminal or smart device having a folding display screen. When the secondary screen is in the expanded state, the target interface can be displayed in the home screen, and the collection panel can be displayed in the secondary screen. The target content can then be added to the collection panel when the collection instruction corresponding to the target content in the target interface is acquired, which functions will not then effect the normal display of the target interface in the home screen by the collection panel and is convenient for the user when the user chooses to add the content in the target interface to the collection panel.

In addition, by expanding the secondary screen and triggering the display of the collection panel on the secondary screen in the expanded state, the foldable features of the folding display screen can be fully utilized, and the opening process of the collection panel can be simplified and more efficient.

In some embodiments, the collection panel can include, but is not limited to, at least one of the following operation controls: a collection operation control, a screen capture operation control, and a screen recording operation control.

In an embodiment, when the collection operation control is included in the collection panel, the content collection method can further include the following steps.

1: acquiring a first trigger signal corresponding to the collection operation control.

The collection operation control can then be a control for triggering the terminal or smart device to perform the collection operation. For example, the collection operation control can be provided as a button. In such an instance, the first trigger signal can refer to the touch operation signal which acts on the collection operation control. For example, the user can click the collection operation control to trigger the terminal or smart device to perform the collection operation.

Illustratively, as shown in FIG. 9, a "new collection" button 91 can be provided in the collection panel 90, wherein the user can click the "new collection" button 91, and accordingly, the terminal or smart device acquires a trigger signal corresponding to the "new collection" button 91.

2: the interface address corresponding to the target interface is added to the collection panel according to the first trigger signal.

When the target interface is a web page, the interface address corresponding to the target interface can be the page address of the web page, for example, URL (Uniform Resource Locator). When the target interface is operating simultaneously as the user interface in an application program, the interface address corresponding to the target interface can be an open path of the user interface.

In some embodiments, when the user needs to collect the target interface, it can be realized by the collection operation control in the collection panel. The interface address of the target interface can then be added to the collection panel by the terminal or smart device. When the user wants to check the target interface, the target interface can be opened in the collection panel by clicking the interface address in the collection panel. The user can then check the interface address in the "link" directory in the collection panel 90.

In another embodiment, when the screen capture operation control is included in the collection panel, the content collection method can further include the following steps.

1: acquiring a second trigger signal corresponding to the screen capture operation control.

In some such embodiments, the screen capture operation control can be the control for triggering the smart device to perform the screen capture operation. For example, the screen capture operation control can be provided as a button. The second trigger signal can then refer to a touch operation signal that acts on the screen capture operation control. For example, the user can click the screen capture operation control to trigger the smart device to perform the screen capture operation.

Illustratively, as shown in FIG. 9, a "screen capture" button 92 can be provided in the collection panel 90, wherein the user clicks on the "screen capture" button 92, and accordingly, the smart device acquires the trigger signal corresponding to the "screen capture" button 92.

2: the screen capture operation is performed on the display content in the home screen to obtain a screen capture image according to the second trigger signal.

When the terminal or smart device can acquire the second trigger signal corresponding to the screen capture operation control, wherein the terminal or smart device can then perform a full screen capture on the display content being displayed on the home screen to obtain the screen capture image. Of course, in other possible embodiments, the user can select a region of which the user desires to take a screen capture for the screen capture so as to obtain a desired screen capture image.

3: the screen capture image can then be added to the collection panel.

In such embodiments, the screen capture image can be added to the collection panel 90 in a picture format, and the user can check the screen capture image in a "picture" directory of the collection panel 90.

In another embodiment, when the screen recording operation control is included in the collection panel, the content collection method can further include the following steps:

1: acquiring a third trigger signal corresponding to the screen recording operation control; wherein the screen recording operation control can refer to a control for triggering the terminal or smart device to perform a screen recording operation. For example, the screen recording operation control can be provided as a button, wherein the third trigger signal can refer to a touch operation signal that acts on the screen recording operation control. For example, the user can click the screen recording operation control to trigger the terminal or smart device to perform the screen recording operation.

Illustratively, as shown in FIG. 9, a "screen recording collection" button 93 is provided in the collection panel 90, the user can click on the "screen recording collection" button 93, and accordingly, the smart device acquires the trigger signal corresponding to the "screen recording collection" button 93.

2. Performing a screen recording video according to the third trigger signal and capturing of the display content in the home screen.

When the terminal or smart device acquires the third trigger signal corresponding to the screen recording operation control, the terminal or smart device starts to record the display content being displayed on the home screen, and obtains a screen recording video with certain duration. The duration of the screen recording can be set by the terminal or smart device or can be set by the user, which is not intended to be limiting, but only illustrative of, various aspects of the disclosure.

3: adding the screen recording video to the collection panel.

In such embodiments, the screen recording video can be added to the collection panel 90 in the format of a video file, and the user can view the screen recording video in the "file" directory of the collection panel 90.

In summary, in the technical solution provided by the embodiments of the present disclosure, by setting operation controls such as the collection operation control, the screen capture operation control, and the screen recording operation control in the collection panel, different needs of the user can be satisfied through the above operation controls, and the category of the collected content in the collection panel is more plentiful, and the collection of different content is more convenient and simple.

In the embodiment, the target content in the collection panel supports a sharing operation, and the sharing operation can include the following sub-steps:

1: displaying the user interface of the target application program in the home screen or another secondary screen.

In such embodiments, the target application program can be any application program. For example, a social application program, an office application program, a shopping application program, a video application program, and the like, the embodiments of the present disclosure are not intended to be limiting, but only illustrative of, various aspects of the present disclosure.

In the embodiment, the number of the secondary screens can be two, that is, the first secondary screen and the second secondary screen. The home screen can then be connected to the first secondary screen and the second secondary screen respectively. For example, the smart device displays the collection panel in the first secondary screen, and displays the user interface of the target application program in the second secondary screen.

2: a second drag operation signal of which the start position can be located at the target content in the collection panel and the end position is located at the user interface of the target application program is received.

The second drag operation signal can in such instances serve as the operation signal for dragging the target content from the collection panel to the user interface of the target application program.

3: According to the second drag operation signal, the target content can be shared to the target application program.

When the terminal or smart device detects the second drag operation signal, the smart device calls the target application program to send the target content to the target application program, so that the user interface of the target application program displays the target content, thereby realizing that the target content is shared from the collection panel to the target application program.

Figure 10:
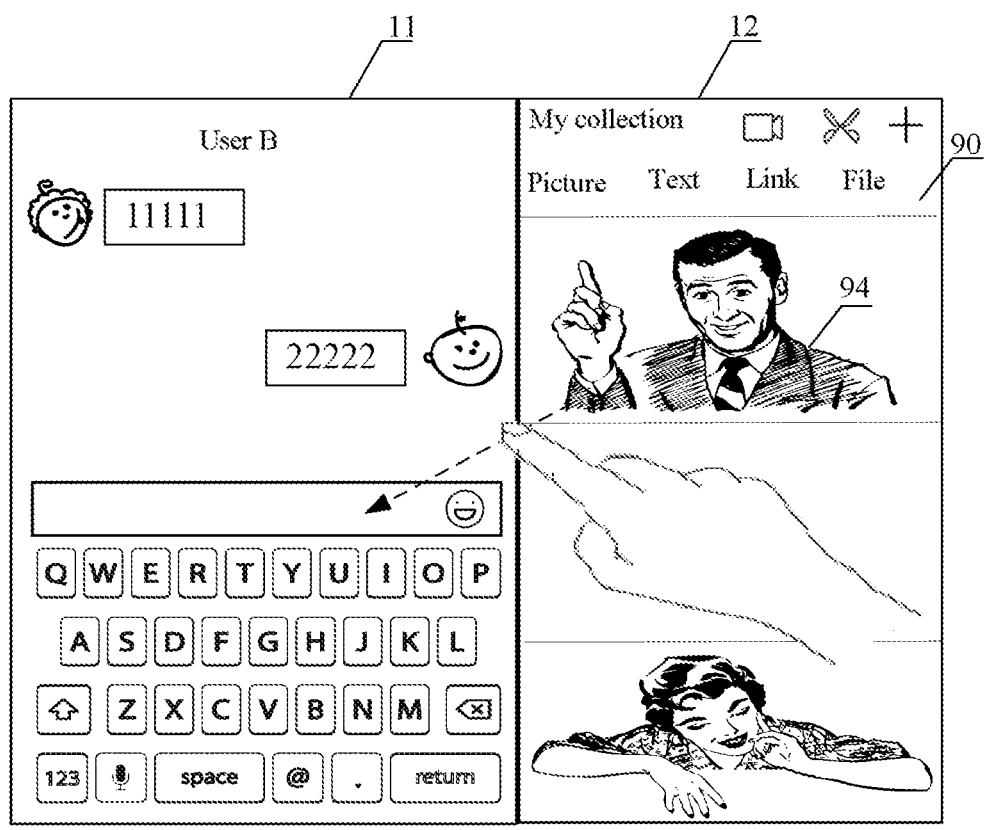
FIG. 10 illustrates a schematic diagram of another exemplary interface of a content sharing process.

Illustratively, as shown in FIG. 10, a chat dialog of the social application program A can be displayed in the home screen 11 of the folding display screen, assuming a chat dialog between user A and user B, and the collection panel 90 is displayed in the secondary screen 12. A picture 94 can then be displayed in the collection panel 90, if the user A wants to share the picture 94 to the user B, the user A can drag the picture 94 in the collection panel 90 from the collection panel 90 to the chat dialog of the social application program A displayed in the home screen 11, thereby realizing that the picture 94 is shared to the user B.

Figure 11:
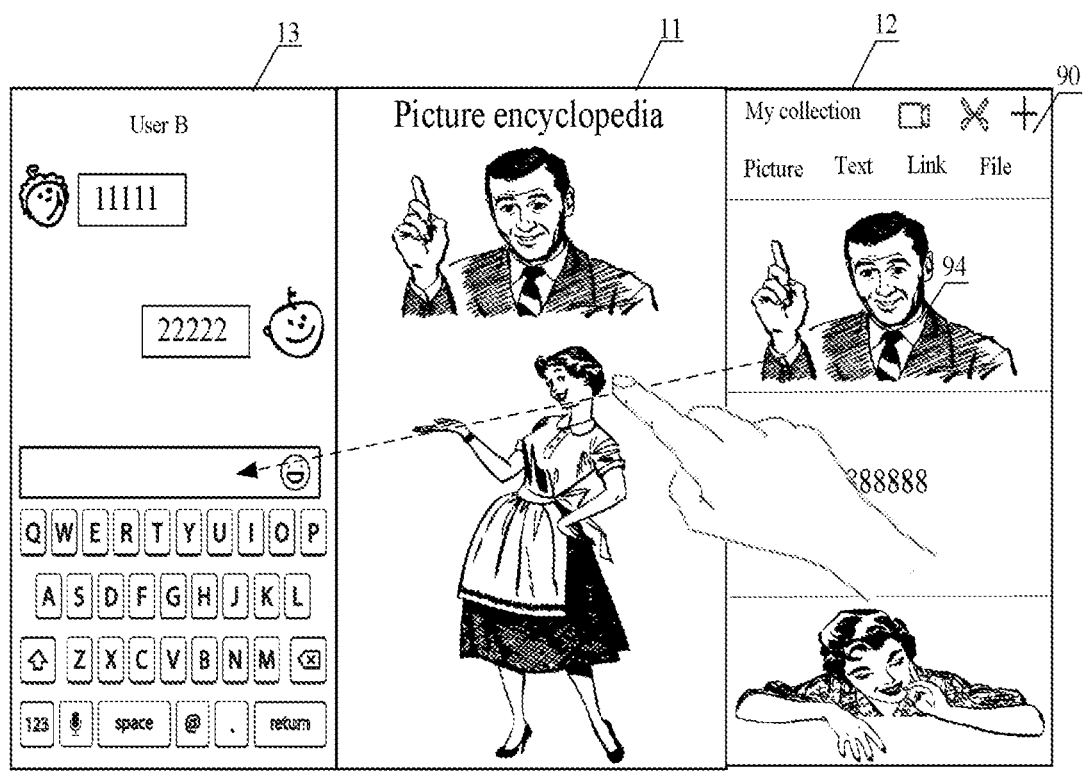
FIG. 11 illustrates a schematic diagram of yet another exemplary interface of another content sharing process.

Illustratively, as shown in FIG. 11, the folding display screen can include the home screen 11, the first secondary screen 12, and the second secondary screen 13. It is assumed that the chat dialog of the social application program A is displayed in the second secondary screen 13, assuming a chat dialog between user A and user B. The collection panel 90 is displayed in the first secondary screen 12, and the web page is displayed on the home screen 11. The picture 94 can then be displayed in the collection panel 90, which can then be added to the collection panel 90 from the web page displayed in the home screen 11. If the user A wants to share the picture 94 to the user B, the user A can drag the picture 94 in the collection panel 90 from the collection panel 90 to the chat dialog of the social application program A displayed in the second secondary screen 13, thereby realizing that the picture 94 is shared to the user B.

In summary, in the technical solution provided by the embodiments of the present disclosure, by dragging the target content in the collection panel to the user interface of the target application program, the target content can be shared to the target application program, and process and the operation is simplified, the downloading and sharing path of the target content is shortened, and the user experience is thus improved.

The following also illustrate embodiments of an apparatus of the present disclosure In such additional embodiments the apparatus can be used to implement the embodiments of the method of the present disclosure. For details not disclosed in the embodiments of the apparatus of the present disclosure, please refer to the embodiments of the method of the present disclosure.

Figure 12:
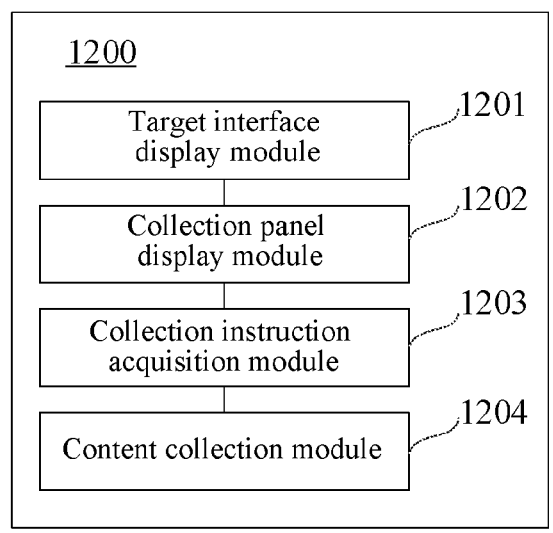
FIG. 12 illustrates a block diagram of an exemplary content collection apparatus according to an exemplary embodiment.

FIG. 12 illustrates a block diagram of a content collection apparatus according to an exemplary embodiment. The apparatus is applied to a terminal or smart device having a folding display screen which can include a home screen and secondary screens of which the number is n, and the home screen and the secondary screens are foldable with each other, and n is a positive integer. The apparatus has the function of implementing the above-mentioned embodiments of the method, and the function can be implemented by hardware, or can be implemented by a hardware executing software. The apparatus 1200 can include: a target interface display module 1201, a collection panel display module 1202, a collection instruction acquisition module 1203, and a content collection module 1204.

The various device components, blocks, or portions may have modular configurations, or are composed of discrete components, but nonetheless may be referred to as "modules" in general. In other words, the "modules" referred to herein may or may not be in modular forms.

The target interface display module 1201 can then be configured to display the target interface in the home screen.

The collection panel display module 1202 can be configured to display the collection panel in the secondary screen when the secondary screen is in the expanded state.

The collection instruction acquisition module 1203 can be configured to acquire the collection instruction corresponding to the target content in the target interface.

The content collection module 1204 can be configured to add the target content to the collection panel according to the collection instruction.

In summary, in the technical solution provided by the embodiments of the present disclosure, the display scheme of a collection panel is provided for the terminal or smart device having the folding display screen, and when the secondary screen is in the expanded state, the target interface can be displayed in the home screen, and the collection panel can be displayed in the secondary screen. The target content can then be added to the collection panel when acquiring a collection instruction corresponding to the target content in the target interface, which will not affect the normal display of the target interface in the home screen by the collection panel and is convenient for the user to add the content in the target interface to the collection panel.

Figure 13:
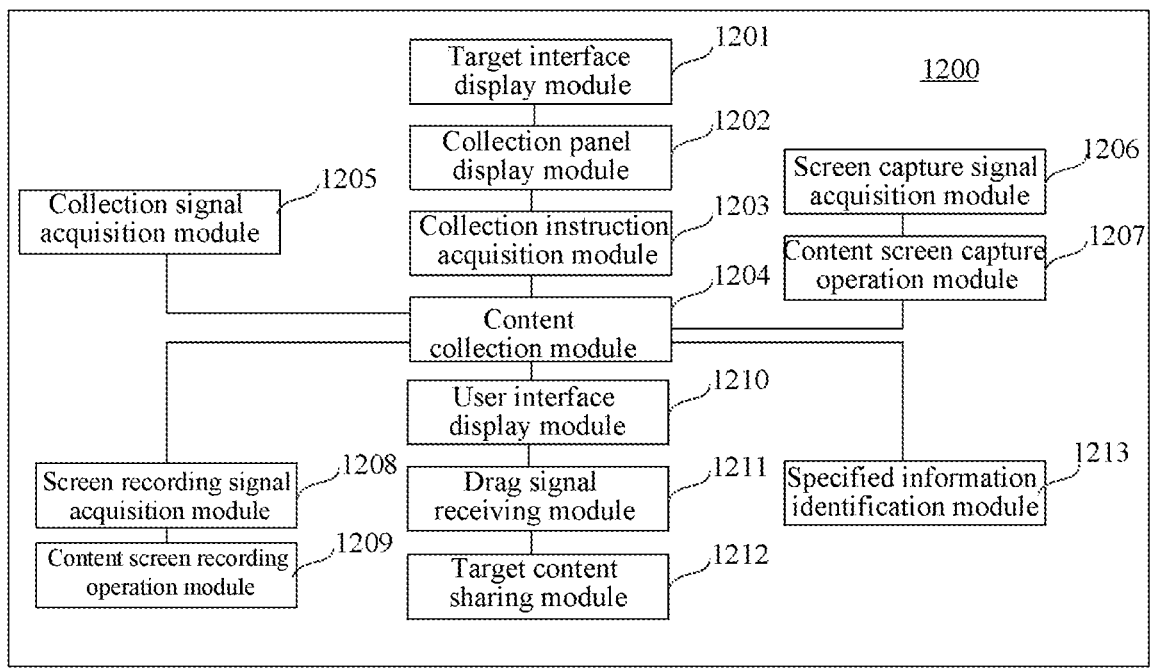
FIG. 13 illustrates a block diagram of a content collection apparatus according to another exemplary embodiment.

In some embodiments, the collection instruction acquisition module 1203 is configured to:

receive the first drag operation signal of which the start position is located at the target content in the target interface and the end position is located at the collection panel; and generate the collection instruction corresponding to the target content according to the first drag operation signal;

As illustrated in some embodiments, the collection panel can include the collection operation control. As shown in FIG. 13, the apparatus 1200 further can include: a collection signal acquisition module 1205.

The collection signal acquisition module 1205 can then be configured to acquire the first trigger signal corresponding to the collection operation control.

The content collection module 1204 can then be further configured to add the interface address corresponding to the target interface to the collection panel according to the first trigger signal.

In some such embodiments, the collection panel can include the screen capture operation control. As shown in FIG. 13, the apparatus 1200 can further include: a screen capture signal acquisition module 1206, and a content screen capture operation module 1207.

The screen capture signal acquisition module 1206 can be configured to acquire the second trigger signal corresponding to the screen capture operation control.

The content screen capture operation module 1207 can then be configured to perform the screen capture operation on the display content in the home screen to obtain a screen capture image.

The content collection module 1204 can be further configured to add the screen capture image to the collection panel.

In the embodiment, the collection panel can include the screen recording operation control. As shown in FIG. 13, the apparatus 1200 can further include: a screen recording signal acquisition module 1208, and a content screen recording operation module 1209.

The screen recording signal acquisition module 1208 can then be configured to acquire the third trigger signal corresponding to the screen recording operation control.

The content screen recording operation module 1209 can then be configured to perform the screen recording operation on the display content in the home screen to obtain the screen recording video according to the third trigger signal.

The content collection module 1204 can then be further configured to add the screen recording video to the collection panel.

In the embodiment, as shown in FIG. 13, the apparatus 1200 can further include: a user interface display module 1210, a drag signal receiving module 1211, and a target content sharing module 1212.

The user interface display module 1210 in this embodiment can be configured to display the user interface of a target application program in the home screen or another secondary screen.

The drag signal receiving module 1211 can then be configured to receive the second drag operation signal of which the start position is located at the target content in the collection panel and the end position is located at the user interface of the target application program.

The target content sharing module 1212 can be configured to share the target content to the target application program according to the second drag operation signal.

In the embodiment, as shown in FIG. 13, the apparatus 1200 can further include: a specified information identification module 1213.

The specified information identification module 1213 can then be configured to identify the specified information included in the target interface, and the specified information can include at least one of the following: a communication number, an address and a mailbox.

The content collection module 1204 can be further configured to add the specified information to the collection panel.

It should be noted that, the apparatus provided by the above embodiments is only exemplified by the division of the above various functional modules when implementing the functions thereof. In practical applications, the above function assignments can be completed by different functional modules according to actual needs. In other words, the content structure of the apparatus is divided into different functional modules to complete all or part of the functions described above.

With regard to the apparatus in the above embodiments, the specific manner in which the respective modules perform the operations has been described in detail in the embodiment relating to the method, and will not be explained in further detail herein.

A content collection apparatus is further provided by an exemplary embodiment of the present disclosure, which is applied to a terminal or smart device having a folding display screen. The folding display screen can include the home screen and secondary screens of which the number is n, and the home screen and the secondary screens are foldable with each other, and n is a positive integer. The above apparatus can implement the content collection method provided by the present disclosure. The apparatus can include: a processor and a memory for storing executable instructions of the processor. In such embodiments, the processor can be configured to:

display the target interface in the home screen;

display the collection panel in the secondary screen when the secondary screen is in an expanded state;

acquire the collection instruction corresponding to the target content in the target interface; and add the target content to the collection panel according to the collection instruction.

In the embodiment, the processor can be further configured to:

receive the first drag operation signal of which a start position is located at the target content in the target interface and the end position is located at the collection panel; and generate the collection instruction corresponding to the target content according to the first drag operation signal.

In the embodiment, the collection panel can include a collection operation control.

In such embodiments, the processor can be further configured to:

acquire the first trigger signal corresponding to the collection operation control; and add the interface address corresponding to the target interface to the collection panel according to the first trigger signal.

In this embodiment, the collection panel can also include a screen capture operation control, wherein the processor can then be further configured to:

acquire the second trigger signal corresponding to the screen capture operation control;

perform the screen capture operation on the display content in the home screen to obtain a screen capture image; and add the screen capture image to the collection panel.

In some such embodiments, the collection panel can include a screen recording operation control, wherein the processor can be further configured to:

acquire the third trigger signal corresponding to the screen recording operation control;

perform the screen recording operation on the display content in the home screen to obtain a screen recording video according to the third trigger signal; and add the screen recording video to the collection panel.

In some embodiments, the processor can be further configured to:

display the user interface of the target application program in the home screen or another secondary screen;

receive the second drag operation signal of which the start position is located at the target content in the collection panel and the end position is located at the user interface of the target application program; and share the target content to the target application program according to the second drag operation signal.

In some additional embodiments, the processor can be further configured to:

identify the specified information included in the target interface, and the specified information includes at least one of the following: a communication number, an address and a mailbox; and add the specified information to the collection panel.

Figure 14:
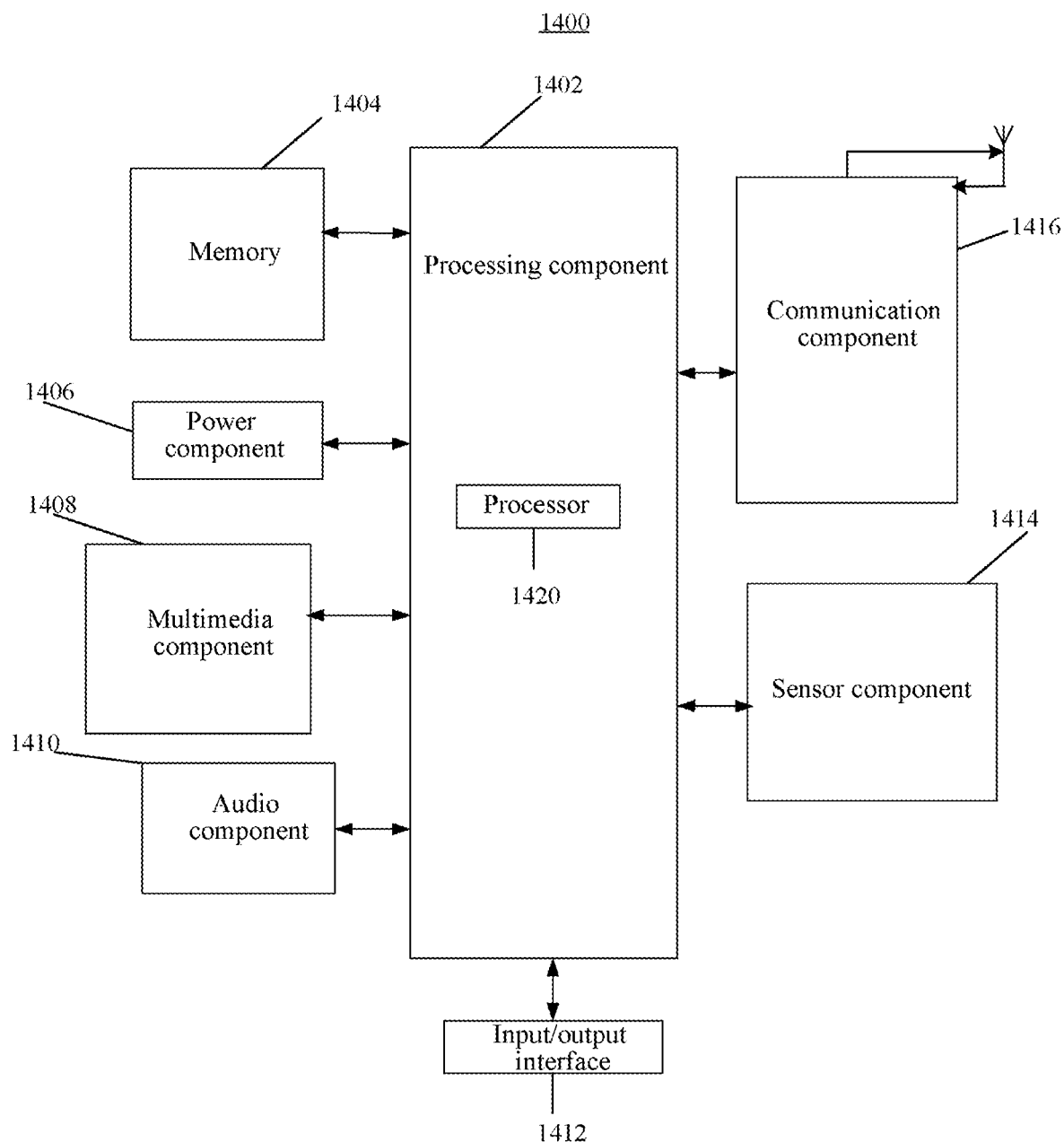
FIG. 14 illustrates a block diagram of another exemplary content collection apparatus according to another exemplary embodiment.

FIG. 14 illustrates a block diagram of an exemplary content collection apparatus 1400 according to another exemplary embodiment. For example, the apparatus 1400 can include a terminal or smart device having a folding display screen, the folding display screen includes a home screen and secondary screens of which the number is n, and the home screen and the secondary screens are foldable with each other, and n is a positive integer. For example, the apparatus 1400 can be a mobile phone, a computer, a digital broadcast smart device, a messaging apparatus, a game console, a tablet apparatus, a medical apparatus, a fitness apparatus, a personal digital assistant, and the like.

Referring to FIG. 14, the apparatus 1400 can include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 can be used to control overall operations of the apparatus 1400, such as the operations associated with display, telephone calls, data communications, camera operations, and recording operations. The processing component 1402 can include one or more processors 1420 to execute instructions to perform all or part of the steps in the above described methods. Moreover, the processing component 1402 can include one or more modules which facilitate the interaction between the processing component 1402 and other components. For instance, the processing component 1402 can include a multimedia module to facilitate the interaction between the multimedia component 1408 and the processing component 1402.

The memory 1404 can be configured to store various types of data to support the operation of the apparatus 1400. Examples of such data include instructions for any applications or methods operated on the apparatus 1400, contact data, phonebook data, messages, pictures, video, etc. The memory 1404 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory or a magnetic or optical disk.

The power component 1406 can be configured to provide power to various components of the apparatus 1400. The power component 1406 can include a power management system, one or more power sources, and any other components associated with the generation, management, and distribution of power in the apparatus 1400.

The multimedia component 1408 can include a screen providing an output interface between the apparatus 1400 and the user. In some embodiments, the screen can include a liquid crystal display (LCD) and a touch panel (TP). If the screen includes the touch panel, the screen can be implemented as a touch screen to receive input signals from the user. The touch panel can include one or more touch sensors to sense touches, slips, and gestures on the touch panel. The touch sensors can, in some instances, not only sense a boundary of a touch or slip action, but also sense a period of time and a pressure associated with the touch or slip action. In some embodiments, the multimedia component 1408 can include a front camera and/or a rear camera. The front camera and the rear camera can receive an external multimedia data while the apparatus 1400 is in an operation mode, such as a photographing mode or a video mode. Each of the front camera and the rear camera can be a fixed optical lens system or have focus and optical zoom capability.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD, OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

The audio component 1410 can be configured to output and/or input audio signals. For example, the audio component 1410 can include a microphone ("MIC") configured to receive an external audio signal when the apparatus 1400 is in an operation mode, such as a call mode, a recording mode or a voice recognition mode. The received audio signal can be further stored in the memory 1404 or transmitted via the communication component 1416. In some embodiments, the audio component 1410 can further include\ a speaker to output audio signals.

The I/O interface 1412 can be configured to provide an interface between the processing component 1402 and peripheral interface modules such as a keyboard, a click wheel, buttons, and the like. The buttons can include, but are not limited to, a home button, a volume button, a starting button or a locking button.

The sensor component 1414 can include one or more sensors to provide status assessments of various aspects of the apparatus 1400. For instance, the sensor component 1414 can detect an open/closed status of the apparatus 1400, relative positioning of components, e.g., can be the display and the keypad of the apparatus 1400, can detect a change in position of the apparatus 1400 or a component of the apparatus 1400, a presence or absence of user contact with the apparatus 1400, an orientation or an acceleration/deceleration of the apparatus 1400 and a change in temperature of the apparatus 1400. The sensor component 1414 can include a proximity sensor configured to detect the presence of nearby objects without any physical contact. The sensor component 1414 can include a light sensor, such as a CMOS or CCD image sensor, for use in imaging applications as well. In some embodiments, the sensor component 1414 can include an accelerometer sensor, a gyroscope sensor, a magnetic sensor, a pressure sensor, or a temperature sensor as well.

The communication component 1416 can be configured to facilitate communication, wired or wirelessly, between the apparatus 1400 and other apparatuses. The apparatus 1400 can then be utilized to access a wireless network based on a communication standard, such as Wi-Fi, 2G, or 3G, or a combination thereof. In one exemplary embodiment, the communication component 1416 receives a broadcast signal or broadcast-associated information from an external broadcast management system via a broadcast channel. In one exemplary embodiment, the communication component 1416 further includes a near field communication (NFC) module to facilitate short-range communications.

In exemplary embodiments, the apparatus 1400 can be realized with one or more application specific integrated circuits (ASIC), digital signal processors (DSP), digital signal processing devices (DSPD), programmable logic devices (PLD), field programmable gate arrays (FPGA), controllers, micro-controllers, microprocessors or other electronic components, for performing above mentioned content collection method.

In exemplary embodiments, there is also provided a non-transitory computer-readable storage medium on which a computer program is stored, the above computer program can be executed by the processor 1420 of the apparatus 1400 to complete the content collection method described above.

For example, the non-transitory computer-readable storage medium can be a ROM, a RAM, a CD-ROM, a magnetic tape, a floppy disc, an optical data storage device, and the like.

It should be understood that "a plurality" as referred to herein means two or more. "and/or" describing the association relationship of the associated object, indicating that there can be three relationships, for example, A and/or B, which can indicate three cases: A exists separately, A and B exist at the same time, and B exists separately. The character "/" generally indicates that the contextual object is an "or" relationship.

The technical solutions provided by various embodiments of the present disclosure can include one or more of the following beneficial effects.

A display scheme of a collection panel is provided for a smart device having a folding display screen, when the secondary screen is in the expanded state, the target interface is displayed in the home screen, and the collection panel is displayed in the secondary screen. The target content is added to the collection panel when the collection instruction corresponding to the target content in the target interface is acquired, which not affects the normal display of the target interface in the home screen by the collection panel and is convenient for the user to add the content in the target interface to the collection panel.

After considering this description and carrying out the embodiments disclosed herein, those skilled in the art can easily think of other implementation aspects of the present disclosure. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and can be modified and changed without departing from the range of the present disclosure. The scope of the present disclosure is only defined by the appended claims.

The foregoing has provided a detailed description with regard to a method and display scheme of a collection panel is provided for a smart device having a folding display screen according to some embodiments of the present disclosure. Specific examples are used herein to describe the principles and implementations of some embodiments. The description is only used to help understanding some of the possible methods and concepts. Meanwhile, those of ordinary skill in the art can change the specific implementation manners and the application scope according to the concepts of the present disclosure. The contents of this specification therefore should not be construed as limiting the disclosure, In addition, those of ordinary skill in the art will also understand that the embodiments described in the specification are just some of the embodiments, and the involved actions and portions are not necessarily all required to realize the functions of the various embodiments.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion such that a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, the commodity, or the device including the element.

In the descriptions, with respect to device(s), terminal(s), etc., in some occurrences singular forms are used, and in some other occurrences plural forms are used in the descriptions of various embodiments. It should be noted, however, that the single or plural forms are not limiting but rather are for illustrative purposes. Unless it is expressly stated that a single device, or terminal, etc. is employed, or it is expressly stated that a plurality of devices, or terminals, etc. are employed, the device(s), terminal(s), etc. can be singular, or plural.

Based on various embodiments of the present disclosure, the disclosed apparatuses, devices, and methods can be implemented in other manners. For example, the abovementioned terminals devices are only of illustrative purposes, and other types of terminals and devices can employ the methods disclosed herein.

Dividing the terminal or device into different "portions," "regions" or "components" merely reflect various logical functions according to some embodiments, and actual implementations can have other divisions of "portions," "regions," or "components" realizing similar functions as described above, with or without such divisions. For example, multiple portions, regions, or components can be combined or can be integrated into another system. In addition, some features can be omitted, and some steps in the methods can be skipped.

Those of ordinary skill in the art will appreciate that the portions, or components, etc. in the devices provided by various embodiments described above can be configured in one or more devices capable of utilizing the components as described above. They can also be located in one or multiple devices that is (are) different from the example embodiments described above or illustrated in the accompanying drawings. For example, the circuits, portions, or components, etc. in various embodiments described above can be integrated into one module or divided into several sub-modules.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

The invention claimed is:

1. A content collection method, wherein the method is applied to a smart device having a folding display screen comprising a home screen and secondary screens of which a number is n, and the home screen and the secondary screens are foldable with each other, and the n is a positive integer;

the method comprising:
displaying a target interface on the home screen;
displaying a collection panel in a secondary screen when the secondary screen is in an expanded state;
acquiring a collection instruction corresponding to target content in the target interface;
adding the target content to the collection panel according to the collection instruction;
displaying a user interface of a target application program in another secondary screen;
receiving a second drag operation signal of which the start position is located at the target content in the collection panel and the end position is located at the user interface of the target application program;
directly sharing the target content from the collection panel to the target application program according to the second drag operation signal, without converting a format of the target content; and
creating a label of the target content in the collection panel after receiving the collection instruction, wherein the label comprises a thumbnail corresponding to the target content, a collection time corresponding to the target content, a source of the target content;
the method further comprising:
triggering the displaying of the collection panel on the secondary screen by expanding the folding display screen in a semi-expanded state,
wherein the secondary screen and the another secondary screen are symmetrical, and the collection panel is a global collection panel configured to facilitate content in any interface of any application program for said directly sharing.

2. The method according to claim 1, wherein the collection panel comprises a collection operation control; the method further comprises:
acquiring a first trigger signal corresponding to the collection operation control;
adding an interface address corresponding to the target interface to the collection panel according to the first trigger signal.

3. The method according to claim 1, wherein the collection panel comprises a screen capture operation control; the method further comprises:
acquiring a second trigger signal corresponding to the screen capture operation control;
performing a screen capture operation on display content in the home screen to obtain a screen capture image; and
adding the screen capture image to the collection panel.

4. The method according to claim 1, wherein the collection panel comprises a screen recording operation control; the method further comprises:
acquiring a third trigger signal corresponding to the screen recording operation control;
performing a screen recording operation on the display content in the home screen to obtain a screen recording video according to the third trigger signal; and
adding the screen recording video to the collection panel.

5. The method according to claim 1,
wherein the target content comprises a picture, and the sharing the target content comprises sharing the picture directly to the target application program according to the second drag operation signal.

6. The method according to claim 1, further comprising:
identifying specified information comprised in the target interface, and the specified information comprises at least one of the following: a communication number, an address and a mailbox; and
adding the specified information to the collection panel.

7. The method according to claim 1, wherein the acquiring a collection instruction corresponding to target content in the target interface comprises:
receiving a first drag operation signal of which a start position is located at the target content in the target interface and an end position is located at the collection panel; and
generating a collection instruction corresponding to the target content according to the first drag operation signal.

8. A content collection apparatus, wherein the apparatus is applied to a user terminal having a folding display screen comprising a home screen and secondary screens of which a number is n, and the home screen and the secondary screens are foldable with each other, and the n is a positive integer;

the apparatus comprising:
a processor;
memory for storing executable instructions of the processor;
wherein the processor is configured to:
display a target interface in the home screen;
display a collection panel in a secondary screen when a secondary screen is in an expanded state;
acquire a collection instruction corresponding to target content in the target interface;
add the target content to the collection panel according to the collection instruction;
display a user interface of a target application program in the home screen or another secondary screen;
receive a second drag operation signal of which the start position is located at the target content in the collection panel and the end position is located at the user interface of the target application program;
directly share the target content from the collection panel to the target application program according to the second drag operation signal, without converting a format of the target content; and
create a label of the target content in the collection panel after receiving the collection instruction, wherein the label comprises a thumbnail corresponding to the target content, a collection time corresponding to the target content, a source of the target content; and
the processor is further configured to:
trigger the displaying of the collection panel on the secondary screen by expanding the folding display screen in a semi-expanded state,
wherein the secondary screen and the another secondary screen are symmetrical, and the collection panel is a global collection panel configured to facilitate content in any interface of any application program for said directly sharing.

9. The apparatus according to claim 8, wherein the collection panel comprises a collection operation control; the processor is further configured to:
acquire a first trigger signal corresponding to the collection operation control; and
add an interface address corresponding to the target interface to the collection panel according to the first trigger signal.

10. The apparatus according to claim 8, wherein the collection panel comprises a screen capture operation control; the processor is further configured to:
- acquire a second trigger signal corresponding to the screen capture operation control;
- perform a screen capture operation on display content in the home screen to obtain a screen capture image; and
- add the screen capture image to the collection panel.

11. The apparatus according to claim 8, wherein the collection panel comprises a screen recording operation control; the processor is further configured to:
- acquire a third trigger signal corresponding to the screen recording operation control;
- perform a screen recording operation on the display content in the home screen to obtain a screen recording video according to the third trigger signal; and
- add the screen recording video to the collection panel.

12. The apparatus according to claim 8, wherein
- the target content comprises a picture, and the sharing the target content comprises sharing the picture directly to the target application program according to the second drag operation signal.

13. The apparatus according to claim 8, wherein the apparatus is further configured to:
- identify specified information comprised in the target interface, and the specified information comprises at least one of the following: a communication number, an address and a mailbox; and
- add the specified information to the collection panel.

14. The apparatus according to claim 8, wherein the processor is further configured to:
- receive a first drag operation signal of which a start position is located at the target content in the target interface and an end position is located at the collection panel; and
- generate a collection instruction corresponding to the target content according to the first drag operation signal.

15. A non-transitory computer-readable storage medium having stored thereon a computer program, when the computer program is executed by a processor, a content collection method is implemented, wherein the method is applied to a user terminal having a folding display screen comprising a home screen and secondary screens of which a number is n, and the home screen and the secondary screens are foldable with each other, and the n is a positive integer;
the method comprising:
- displaying a target interface on the home screen;
- displaying a collection panel in a secondary screen when a secondary screen is in an expanded state;
- acquiring a collection instruction corresponding to target content in the target interface;
- adding the target content to the collection panel according to the collection instruction;
- displaying a user interface of a target application program in another secondary screen;
- receiving a second drag operation signal of which the start position is located at the target content in the collection panel and the end position is located at the user interface of the target application program;
- directly sharing the target content from the collection panel to the target application program according to the second drag operation signal, without converting a format of the target content; and
- creating a label of the target content in the collection panel after receiving the collection instruction, wherein the label comprises a thumbnail corresponding to the target content, a collection time corresponding to the target content, a source of the target content;

the method further comprising:
- triggering the displaying of the collection panel on the secondary screen by expanding the folding display screen in a semi-expanded state,
- wherein the secondary screen and the another secondary screen are symmetrical, and the collection panel is a global collection panel configured to facilitate content in any interface of any application program for said directly sharing.

16. The non-transitory computer-readable storage medium according to claim 15, wherein the collection panel comprises a collection operation control; the computer program is executed by the processor to further perform:
- acquiring a first trigger signal corresponding to the collection operation control; and
- adding an interface address corresponding to the target interface to the collection panel according to the first trigger signal.

17. The non-transitory computer-readable storage medium according to claim 15, wherein the collection panel comprises a screen capture operation control; and wherein the computer program is executed by the processor to further perform:
- a second trigger signal corresponding to the screen capture operation control;
- perform a screen capture operation on display content in the home screen to obtain a screen capture image; and
- add the screen capture image to the collection panel.

18. The non-transitory computer-readable storage medium according to claim 15, wherein the collection panel comprises a screen recording operation control; wherein the computer program is executed by the processor to further perform:
- acquiring a third trigger signal corresponding to the screen recording operation control;
- performing a screen recording operation on the display content in the home screen to obtain a screen recording video according to the third trigger signal; and
- adding the screen recording video to the collection panel.

19. The non-transitory computer-readable storage medium according to claim 15, wherein
- the target content comprises a picture, and the sharing the target content comprises sharing the picture directly to the target application program according to the second drag operation signal.

20. The non-transitory computer readable storage medium according to claim 15, wherein the computer program is executed by the processor to further perform:
- receiving a first drag operation signal of which a start position is located at the target content in the target interface and an end position is located at the collection panel; and
- generating a collection instruction corresponding to the target content according to the first drag operation signal.

* * * * *